United States Patent [19]
Roess

[11] 3,770,336
[45] Nov. 6, 1973

[54] HARMONIC READOUT OF A VOLUME HOLOGRAM IN AN OPTICALLY REVERSIBLE MEDIUM

[75] Inventor: Dieter Roess, Planegg, Germany

[73] Assignee: Siemens Aktiengesellschaft, Berlin and Munich, Germany

[22] Filed: Dec. 30, 1971

[21] Appl. No.: 213,919

[30] Foreign Application Priority Data
Jan. 11, 1971    Germany.................... P 21 01 048.0

[52] U.S. Cl. ............... 350/3.5, 307/88.3, 350/160 P
[51] Int. Cl. ............................................. G02b 27/00
[58] Field of Search ........................ 350/3.5, 160 P; 307/88.3; 340/173 CC, 173 LT, 173 LM

[56] References Cited
UNITED STATES PATENTS
3,592,528    7/1971    Kiss .................................. 350/160 P
3,602,724    8/1971    Smith ................................ 307/88.3

Primary Examiner—David Schonberg
Assistant Examiner—Ronald J. Stern
Attorney—Carlton Hill et al.

[57] ABSTRACT

The present invention is directed to an optical readout method and apparatus for utilizing a storage medium of reversible optical material on which information is recorded, preferably in the form of holograms, characterized by utilizing as a retrieval or reading light beam, a light beam having a harmonic frequency of the light beam utilized for recording the information on the storage medium. By utilizing a light beam for reading which is a harmonic of the frequency of the light beam used for recording, the reading process will not cause detrimental changes in the optical state of the reversible optical storage medium.

7 Claims, 1 Drawing Figure

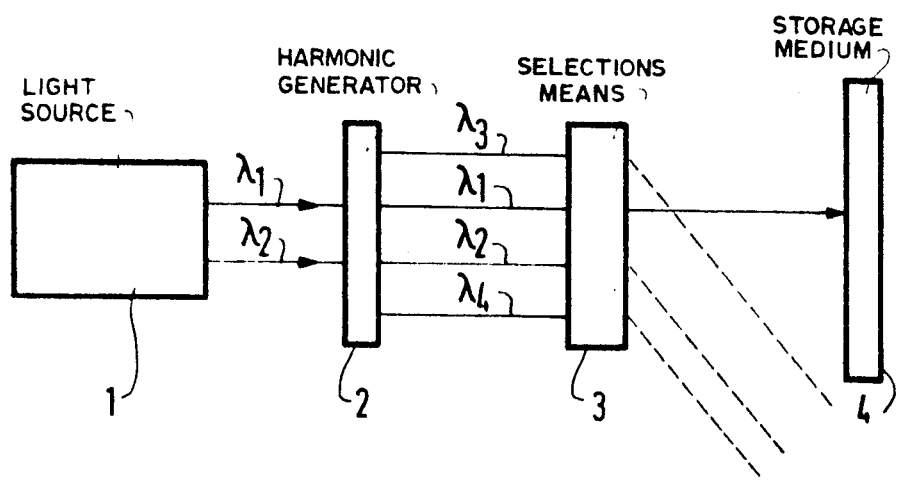
INVENTOR
Dieter Roess

HARMONIC READOUT OF A VOLUME HOLOGRAM IN AN OPTICALLY REVERSIBLE MEDIUM

BACKGROUND OF THE INVENTION

1. Field of the Invention

The present invention is directed to the method and apparatus for reading information stored on an erasable storage medium.

2. Prior Art

Storage materials which can be exposed and erased as often as desired have been suggested as a reversible recordation media particular for information stored as holograms. In such a material, a transition in the optical characteristics occurs when exposed by a light of a particular wavelength and such change in the optical characteristics is erased or removed by exposure by a light of a second wavelength. For example, exposure by a light of a first wavelength, the optical properties such as absorption of a certain range of light is increased with the degree of absorption being dependent upon the time and intensity of exposure. When exposed with the second light beam, the absorption characteristic is eliminated. Examples of such material are photochromic glass which are discussed in an article by Gale P. Smith entitled "Chameleon in the Sun: Photochromic Glass" *IEEE SPECTRUM*, Vol. 3, No. 12, December 1966, pages 39–47. Another example of material is an alkali halide crystals which is discussed in an article by Irwin Schneider entitled "Information Storage Using the Anisotropy of Color Centers in Alkali Halide Crystals" *Applied Optics* Vol. 6, No. 12, December 1967, pages 2197–2198. In both of these examples the materials are transparent in their basic state and when exposed to a light of a certain frequency they become evenly colored to absorb and block transmission of a light of a certain range of the spectrum. It has been suggested that if one of these materials has been evenly colored with a light suitable wavelength, a volume hologram can be recorded in the colored material by means of a bleaching process utilizing the light beam of a suitable wavelength.

For the reconstruction of a hologram which is stored in such a reversible recording medium, the same wavelength utilized in recordation must be used during reconstruction of the hologram during retrieval to obtain the three dimensional structure. A great drawback of this method is that during the retrieval or reconstruction process, the stored interference picture is partially damaged with each reconstruction process. This is due to the activated state of the silver halide crystallites in the photochromic glass and the F centers in the alkali crystals being susceptible to additional changes from exposure by the retrieving beam. Thus the efficiency of the reconstruction of the hologram recorded on a storage medium of either photochromic glass or alkali halide crystals is greatly reduced. One reason suggested for this drawback is that the crystals are thick with respect to the light wavelength and the interference picture is thus a space lattice which usually allows only a reconstruction with the wavelength which is applied during the recording process.

SUMMARY OF THE INVENTION

The present invention is directed to the method and apparatus for retrieving information stored in a reversible optical storage medium without inducing additional transitional changes in the storage medium during the reading process. The invention accomplishes the retrieval of information stored in a reversible optical storage media particularly information stored in the form of holograms by utilizing a reading light beam which is a harmonic frequency of the light beam utilized for recording the information on the media. Preferably, the light beam for reading or retrieval is formed by projecting the recording light beam through a harmonic generator utilizing the effects of non-linear optical materials. In the preferred embodiment of the apparatus for executing the preferred method of the invention, a light source emitting light of one or more frequency is utilized with one of the frequency being for recording and the other frequency being for the purposes for erasing the storage media. The apparatus included a harmonic generator and means for selectively projecting the light beam of the desired frequency whether it is an erasing, a recording, or a reading light beam onto the reversible optical storage medium so that only the light beam of the correct frequency for any particular step is applied to the storage medium.

BRIEF DESCRIPTION OF THE DRAWINGS

The FIGURE is a schematic presentation of the apparatus for performing the method of the present invention.

DESCRIPTION OF THE PREFERRED EMBODIMENTS

The principles of the present invention are utilized in an apparatus for projecting a light beam onto a storage medium to retrieve information stored thereon. The apparatus includes a suitable light source 1 such as a laser which emits a wavelength $\lambda 1$ which is suitable for recordation of the information on a reversible optical storage media 4. Preferably, the light source 1 is a laser which emits more than one frequency and thus emits a wavelength $\lambda 2$ which is suitable for erasing information recorded on the reversible optical storage media 4.

To obtain a harmonic frequency of the light beam having wavelength $\lambda 1$, the beam is projected through a harmonic generator 2 which utilizes a non-linear optical medium which causes the emerging light beam to contain a harmonic frequency of the light of the frequency $\lambda 1$ which harmonic frequency has a wavelength $\lambda 3$. If an erasing light beam with a wavelength of $\lambda 2$ is projected through the harmonic generator 2, a fourth light beam which is the harmonic of the erasing light beam has a wavelength $\lambda 4$.

To selectively project a light beam of a desired wavelength whether it is the recording light beam with the wavelength $\lambda 1$, the reading light beam with the wavelength $\lambda 3$, or an erasing light beam having a wavelength $\lambda 2$ onto the storage medium 4, means 3 for selectively projecting the desired wavelength onto the storage medium 4 is provided. The means for selecting the desired light beam can be a frequency switch which selectively transmits and projects the light beam of the desired frequency onto the storage media 4 while deflecting the light beams of other frequencies from projecting onto the storage medium 4. An example of such a frequency switch is constructed of a combination of several phase shifters, polarization filters and rotation elements. By applying a voltage to selected polarization filters, the frequency switch will pass a light beam of a desired frequency. Thus by energizing different polarization filters, any one of the light beams having a wavelength of $\lambda 1$, $\lambda 2$, $\lambda 3$ or $\lambda 4$ can be directed at the storage medium 4.

The method and apparatus of the present invention utilize the recognition that an interference picture which is stored on the storage medium 4 is a space lattice with a periof of $\lambda 1$ and that this space lattice represents simultaneously a cover lattice with the harmonic period of $\lambda 1/k$ with $k$ equal to 2, 3 .... Thus a light beam with a wavelength of $\lambda 3$ which is applied during the reading process, corresponds to the harmonic of the recording wavelength $\lambda 3 = \lambda 1/k$. Of course the harmonic must be selected which does not flatten or erase respectively the stored space lattice by means of additional transitional changes in the storage medium 4.

Preferably, the information is recorded on the medium 4 by first coloring the entire medium 4 with a short wavelength $\lambda 2$ and then recording the hologram pattern by bleaching with a longer wavelength $\lambda 1$. During retrieval by construction of the hologram, the wavelength $\lambda 3$ which is a harmonic of the recording wavelength $\lambda 1$ does not erase the hologram or cause further transition in the reversible optical storage medium 4.

By obtaining the frequency multiplication of the laser radiation with the help of a harmonic generator using the non-linear effects of a non-linear optical material, the efficiency in obtaining the harmonic of the recording frequency is almost 100%.

With thin layers for the storage medium 4, the demands are less strict so that even a different light source with sufficiently exact frequency relation may be applied.

The method of projecting the light beam which is a harmonic frequency of the frequency of the recording light beam can also be utilized for retrieving information stored in a storage medium which produces merely a phase change by means of a defraction index variation such as found in a volume phase hologram. An example of such a material is an optical frequency shifting type material such as $LiNbO_3$.

Although minor modifications might be suggested by those versed in the art, I wish to incorporate all embodiments and modifications which come within the scope of my contribution to the art.

I claim:

1. In a method of recording and retrieving information stored in a reversible optical storage medium as a volume hologram by projecting a light beam thereon, the reversible storage medium being of a material whose optical properties change from one condition to a second condition when exposed to a light beam of a given frequency and change back to the one condition when subsequently exposed to a light beam of a second frequency and whose optical properties do not change when exposed to a light beam of a third frequency the improvement comprising recording said information as a volume hologram in a material having said third frequency as a harmonic of said given frequency with a light beam of said given frequency, providing a reading light beam having said third frequency which is the harmonic of the frequency of the light beam utilized to record the information as a volume hologram on the storage media, and projecting the reading light beam onto the storage medium to retrieve the information contained in the volume hologram without adversely causing optical changes in the storage medium.

2. In a method according to claim 1, wherein the reading light beam is provided by passing the recording light beam through a harmonic generator utilizing a non-linear optical material to obtain the reading light beam having a harmonic frequency of the frequency of the recording light beam.

3. In a method according to claim 2, when the passing of the recording light beam through the harmonic generator produces a beam of light of the recording frequency and a reading light beam having a harmonic frequency of the frequency of the recording beam, and which method further includes the step of selectively projecting the recording light beam and the reading light beam on the storage medium to selectively record information thereon and to retrieve information therefrom.

4. In an apparatus for recording and retrieving information recorded in a volume hologram on a reversible optical storage medium by a beam of light having a recording frequency, the storage medium being of a material whose optical properties change from one condition to another condition when the material is exposed by a light beam of a given frequency and changed back to the one condition when subsequently exposed to a light beam of a second frequency and whose optical properties do not change when exposed to a light beam of a third frequency, said apparatus having a means for projecting a light beam on the storage medium, the improvement comprising said means for projecting including means for recording said information as a volume hologram comprising a source of light at said given frequency for use as a recording light beam, and means for generating a reading light beam having said third frequency which is a harmonic of the given frequency of the recording light beam so that as the reading light beam is projected on the storage medium the information contained in the volume hologram is retrieved without causing optical changes in the storage medium.

5. In an apparatus according to claim 4, wherein said means for generating a reading light beam includes a harmonic generator comprising a non-linear optical medium for producing a reading light beam having a frequency which is a harmonic of the frequency of a recording light beam.

6. In an apparatus according to claim 5, wherein the harmonic generator produces light beams having the frequency of the recording light beam and light beams having the frequency of the reading light beam and wherein said means of projecting further include means for selectively projecting the recording light beam and the reading light beam on the storage medium to selectively record information thereon and to selectively read information recorded thereon.

7. In an apparatus according to claim 6, wherein the light source produces a light beam having said second frequency for utilization as an erasing beam of light and wherein the means for selectively projecting is capable of selectively projecting the erasing beam of light on the storage medium for erasing information recorded thereon.

* * * * *